US012591731B2

(12) United States Patent
Bose et al.

(10) Patent No.: US 12,591,731 B2
(45) Date of Patent: Mar. 31, 2026

(54) SYSTEM AND METHOD FOR SELECTING RELEVANT CONTENT IN AN ENHANCED VIEW MODE

(71) Applicant: Microsoft Technology Licensing, LLC, Redmond, WA (US)

(72) Inventors: Joy Bose, Hyderabad (IN); Amit Kundlia, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/414,239

(22) Filed: May 16, 2019

(65) Prior Publication Data

US 2020/0364290 A1      Nov. 19, 2020

(51) Int. Cl.
| | |
|---|---|
| *G06F 40/109* | (2020.01) |
| *G06F 3/04847* | (2022.01) |
| *H04L 67/306* | (2022.01) |
| *H04L 67/50* | (2022.01) |
| *G06F 3/01* | (2006.01) |
| *H04L 67/02* | (2022.01) |

(52) U.S. Cl.
CPC ........ *G06F 40/109* (2020.01); *G06F 3/04847* (2013.01); *H04L 67/306* (2013.01); *H04L 67/535* (2022.05); *G06F 3/013* (2013.01); *G06F 3/015* (2013.01); *H04L 67/02* (2013.01)

(58) Field of Classification Search
CPC .... G06F 40/109; G06F 3/04847; G06F 3/013; G06F 3/015; H04L 67/22; H04L 67/306; H04L 67/02

USPC .......................................................... 715/269
See application file for complete search history.

(56) References Cited

U.S. PATENT DOCUMENTS

| | | | |
|---|---|---|---|
| 5,886,683 A | 3/1999 | Tognazzini et al. | |
| 9,037,975 B1 | 5/2015 | Taylor et al. | |
| 9,418,118 B2 * | 8/2016 | Haveliwala | G06F 16/345 |
| 9,423,932 B2 * | 8/2016 | Kroupa | G06F 3/0483 |
| 9,645,999 B1 * | 5/2017 | Ciulla | G06F 16/35 |

(Continued)

OTHER PUBLICATIONS

Biersdorfer, J.D, Reader Mode in Safari, Jul. 3, 2018, The New York Times, Tech Tip (Year: 2018).*

(Continued)

*Primary Examiner* — William L Bashore
*Assistant Examiner* — Tionna M Burke

(57) ABSTRACT

Aspects of the present disclosure include devices and methods for selecting relevant content in an enhanced view mode. In an example, a computer device may be configured to receive digital content to be displayed by a web-based application according to a first view mode. The computer device may be configured to determine an enhanced view mode is enabled, wherein the enhanced view mode is different from the first view mode. The computer device may be configured to identify one or more first portions of primary content of the digital content to be displayed according to the enhanced view mode based on user information. The computer device may be configured to cause display of the one or more first portions of the primary content in the web-based application according to the enhanced view mode, and one or more second portions of the primary content according to a second view mode different from the enhanced view mode.

20 Claims, 9 Drawing Sheets

(56) References Cited

U.S. PATENT DOCUMENTS

| 2008/0253757 A1* | 10/2008 | Bells | G03B 17/00 396/77 |
| 2010/0161631 A1* | 6/2010 | Yu | H04L 67/306 707/758 |
| 2012/0192082 A1* | 7/2012 | Bakalov | G06F 16/954 715/747 |
| 2013/0074009 A1* | 3/2013 | Jones | G06F 16/285 715/810 |
| 2013/0246926 A1* | 9/2013 | Vemireddy | G06F 16/9535 715/738 |
| 2014/0344012 A1* | 11/2014 | Kamhi | G06F 3/005 705/7.29 |
| 2018/0081432 A1 | 3/2018 | Chen et al. | |

OTHER PUBLICATIONS

"International Search Report and Written Opinion Issued in PCT Application No. PCT/US2020/028031", Mailed Date: Jul. 2, 2020, 10 Pages.

* cited by examiner

Color Selector

324

Font Selector

326

Position Selector (where to display
on the webpage)

328

Enhanced View
Mode Enabled

330

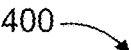

400

```
┌─────────────────────────────────────────────────┐
│  Receiving digital content to be displayed by a  │ ⟍── 402
│  web-based application according to a first view │
│                    mode                          │
└─────────────────────────────────────────────────┘
                         │
                         ▼
┌─────────────────────────────────────────────────┐
│                                                  │ ⟍── 404
│    Determining an enhanced view mode is enabled  │
│                                                  │
└─────────────────────────────────────────────────┘
                         │
                         ▼
┌─────────────────────────────────────────────────┐
│  Identify one or more first portions of primary  │ ⟍── 406
│  content of the digital content to be displayed  │
│    according to the enhanced view mode based on  │
│                  user information                │
│  ┌ ─ ─ ─ ─ ─ ─ ─ ─ ─ ─ ─ ─ ─ ─ ─ ─ ─ ─ ─ ─ ─ ┐  │
│  │ Receiving the user information based on one │  │ ⟍── 408
│  │   or more user inputs of an input device    │  │
│  └ ─ ─ ─ ─ ─ ─ ─ ─ ─ ─ ─ ─ ─ ─ ─ ─ ─ ─ ─ ─ ─ ┘  │
│                                                  │
│  ┌ ─ ─ ─ ─ ─ ─ ─ ─ ─ ─ ─ ─ ─ ─ ─ ─ ─ ─ ─ ─ ─ ┐  │
│  │Predicting, through machine learning, user   │  │ ⟍── 410
│  │interests based on a user profile; and       │  │
│  │determining the user information based on the│  │
│  │predicted user interests                     │  │
│  └ ─ ─ ─ ─ ─ ─ ─ ─ ─ ─ ─ ─ ─ ─ ─ ─ ─ ─ ─ ─ ─ ┘  │
│                                                  │
│  ┌ ─ ─ ─ ─ ─ ─ ─ ─ ─ ─ ─ ─ ─ ─ ─ ─ ─ ─ ─ ─ ─ ┐  │
│  │ Receiving the user information based on one │  │ ⟍── 412
│  │      or more monitored user actions         │  │
│  └ ─ ─ ─ ─ ─ ─ ─ ─ ─ ─ ─ ─ ─ ─ ─ ─ ─ ─ ─ ─ ─ ┘  │
└─────────────────────────────────────────────────┘
                         │
                         ▼
┌─────────────────────────────────────────────────┐
│   Displaying the one or more first portions of   │ ⟍── 414
│   the primary content in the web-based           │
│   application according to the enhanced view     │
│   mode, and one or more second portions of the   │
│   primary content according to a second view mode│
└─────────────────────────────────────────────────┘
```

FIG. 4

500
510
502
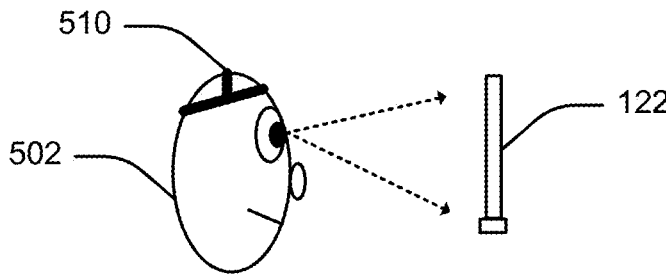
122
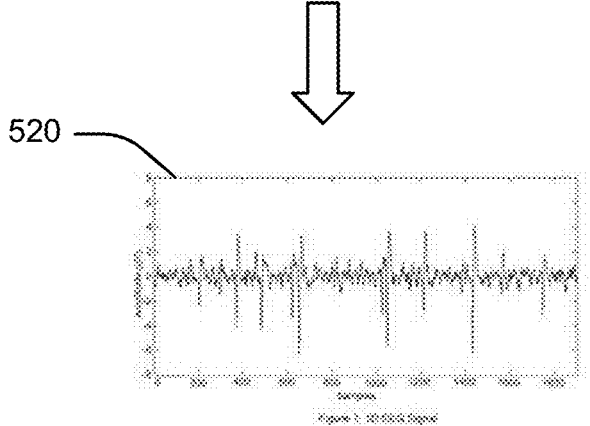
520
FIG. 5

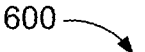
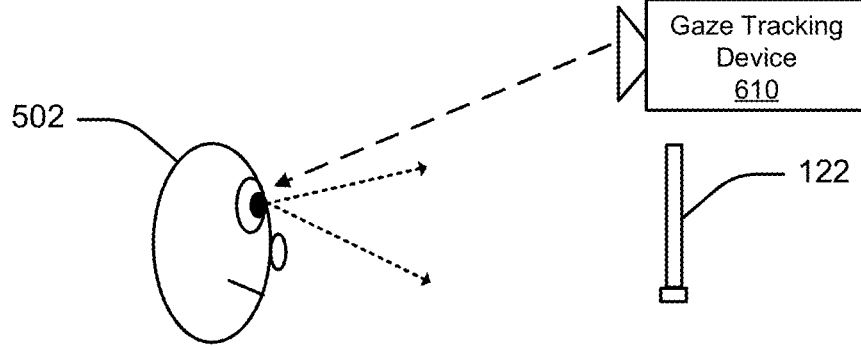
FIG. 6

SYSTEM AND METHOD FOR SELECTING RELEVANT CONTENT IN AN ENHANCED VIEW MODE

BACKGROUND

The present disclosure relates to display of content on computer devices, and more particularly, to systems and methods for selecting relevant content in an enhanced view mode.

Web-based applications (e.g., web browser) display digital content, such as webpages, to provide information to users of the web-based applications. The digital content is typically displayed according to a view that is set by the provider of the digital content and settings of the web-based application itself. Some web-based applications provide a setting for a user to select to have the digital content displayed according to a reading mode, in which the digital content is enlarged for easier reading and advertisements are removed from the displayed digital content. The reading mode may provide users with a better user experience by making reading of the digital content easier. However, in some situations, not all portions of the digital content are relevant to a user and therefore a user experience in the reading mode may be diminished due to all the digital content being displayed according to the reading mode.

Thus, there is a need in the art for improvements in the display of digital content.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a method, executed by a computer processor, for selecting relevant content in an enhanced view mode. The method may include receiving digital content to be displayed by a web-based application according to a first view mode. The method may include determining an enhanced view mode is enabled, wherein the enhanced view mode is different from the first view mode. The method may include identifying one or more first portions of primary content of the digital content to be displayed according to the enhanced view mode based on user information. The method may include displaying the one or more first portions of the primary content in the web-based application according to the enhanced view mode, and one or more second portions of the primary content according to a second view mode different from the enhanced view mode.

In an example, the disclosure provides a computer device for selecting relevant content in an enhanced view mode. The computer device may include a memory storing instructions and a processor communicatively coupled with the memory. The processor may be configured to execute the instructions to receive digital content to be displayed by a web-based application according to a first view mode. The processor may be configured to execute the instructions to determine an enhanced view mode is enabled, wherein the enhanced view mode is different from the first view mode.

The processor may be configured to execute the instructions to identify one or more first portions of primary content of the digital content to be displayed according to the enhanced view mode based on user information. The processor may be configured to execute the instructions to cause display of the one or more first portions of the primary content in the web-based application according to the enhanced view mode, and one or more second portions of the primary content according to a second view mode different from the enhanced view mode.

In another example, the disclosure provides a computer-readable medium storing instructions executable by a processor. The computer-readable medium may include at least one instruction to receive digital content to be displayed by a web-based application according to a first view mode. The computer-readable medium may include at least one instruction to determine an enhanced view mode is enabled, wherein the enhanced view mode is different from the first view mode. The computer-readable medium may include at least one instruction to identify one or more first portions of primary content of the digital content to be displayed according to the enhanced view mode based on user information. The computer-readable medium may include at least one instruction to cause display of the one or more first portions in the web-based application according to the enhanced view mode, and one or more second portions of the primary content according to a second view mode different from the enhanced view mode.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 4 is a flowchart of an example method for selecting relevant content in an enhanced view mode, according to aspects of the present disclosure;

FIG. 5 is a conceptual diagram of an example of a device for identifying content for an enhanced view mode, according to aspects of the present disclosure;

FIG. 6 is a conceptual diagram of an example of another device for identifying content for an enhanced view mode, according to aspects of the present disclosure.

DETAILED DESCRIPTION

Figure 1:
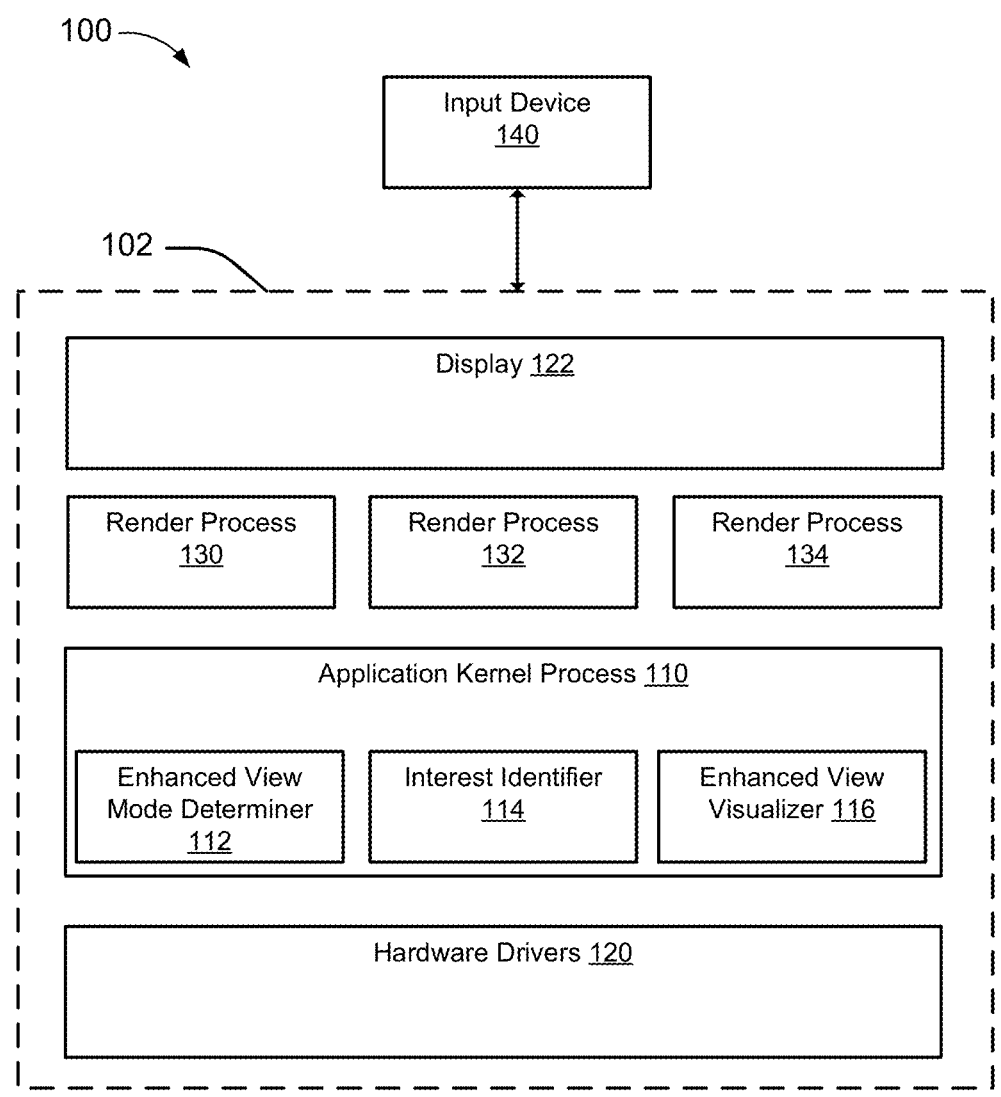
FIG. 1 is a conceptual diagram of an example web-based application environment for selecting relevant content in an enhanced view mode, according to aspects of the present disclosure.

The present disclosure provides devices and methods for selecting relevant content in an enhanced view mode based on user information. In an example, the devices and methods disclosed herein may allow a web-based application (e.g., web browser) to display portions of content in an enhanced view mode, based on user information, while other portions of the content are displayed in a different view mode. An enhanced view mode may include an increase in font size, a change in color to font or background, a change in image size, or any other enhancement to content displayed on the web-based application which facilitates an enhanced user viewing experience for reading, as compared to a standard view mode of the content.

In this disclosure, techniques for a user to indicate selective portions or regions of a webpage for viewing in an enhanced view mode are disclosed. These techniques may assist a user in viewing the webpage, and specifically, the portions of the webpage that are relevant or of interest to the user. The techniques may also include ways for a system to automatically predict and detect which portions of a webpage the user is interested in, and to automatically enhance the predicted portions of the webpage.

The techniques may also include methods to identify areas of interest for the user. In some aspects, the area of interest may be selected in response to one or more user actions. For example, the user actions may correspond to a user input such as one or more gestures from a touch screen, a pen device, a camera, a microphone, or a mouse, or one or more gestures corresponding to a hand or body movement captured by a camera and/or via an augmented reality (AR) device (e.g., Hololens) or a movement detection device (e.g., Kinect).

In some implementations, the area of interest may be identified and selected in response to a prediction of the area of interest. For example, the prediction may be based on a user profile including historical data associated with a user including a demographic profile of the user, past internet or universal resource locator (URL) searches performed by the user, past regions that were enhanced via an enhanced view mode for the user, or fields of interest (e.g., sports, politics) of the user. For instance, the disclosed system or device may determine which regions of a webpage are closest to the areas of interest associated with the user by measuring similarity of portions of the webpage using word vectors or matching algorithms or using topic modelling to identify fields or topics covered by portions of the webpage and selecting areas of interest on the web page that are closest to the areas of interest associated with the user.

In some implementations, the area of interest may be identified in response to one or more input devices. For example, but not limited hereto, areas of interest may be identified in response to an increased interest of a portion of webpage based on input from one or more of an electroencephalography (EEG) kit, a gaze tracking device, or a scroll device or mouse pointer change. In an example, the EEG kit may identify an area of interest based on an EEG attention level of the user increasing above a threshold when looking at a portion of the webpage. In another example, the gaze tracking device may identify an area of interest based on a user staring at a particular portion of the webpage for a threshold amount of time. In another example, the scroll device or mouse pointer may identify an area of interest based on a cursor remaining at a portion of the webpage for a threshold amount of time.

Once an area of interest has been identified, the system may display the area of interest according to an enhanced view mode while remaining portions of the webpage are viewed at a non-enhanced view mode. The system may use a standardized format to save the fields of interest of the enhanced view mode. This may allow the enhanced view mode to be invoked for similar fields of interest on a new webpage at a subsequent time. In an example, the system may save the fields of interest according to a format file (e.g., Javascript Object Notation (JSON) format or comma-separated values (CSV) format). In some examples, each line in a saved format file may include a field containing a topic and weight pair. In some examples, a topic value may give the name of the topic and weight may give the relative importance of the topic.

Turning now to the figures, examples of devices and methods for selecting relevant content for displaying in an enhanced view mode based on user information are described herein. It is to be understood that aspects of the figures may not be drawn to scale and are instead drawn for illustrative purposes.

Referring to FIG. 1, an example web-based application environment 100 for selecting relevant content in an enhanced view mode is shown. The web-based application environment 100 may include a computer device 102 connected to one or more input devices 140. The computer device 102 may be, for example, any mobile or fixed computer device including but not limited to a desktop, a laptop, a tablet computer, a cellular telephone, a gaming device, a mixed reality or virtual reality device, a music device, a television, a navigation system, a camera, a personal digital assistant (PDA), a handheld device, or any other type of computerized device capable of displaying content in a web-based application. The input device 140 may be, for example, any stylus, mouse, touch screen, microphone, motion detecting device (e.g., Kinect, Hololens), camera, or any input device having capability to capture a gesture or motion of a user.

The computer device 102 may include a application kernel process 110 configured to coordinate rendering processes for a webpage between hardware drivers 120 and one or more render processes including render processes 130, 132, 134 for rendering content on a display 122. The hardware drivers 110 may be configured to access hardware for rendering one or more webpages. The hardware drivers 110 may include drivers for, but not limited to, the display 122, a graphics processing unit, or a web-based application communications device. Each of the render processes 130, 132, 134 may be configured to render one or more portions of content in a web-based application. For example, the render process 130 may correspond to rendering content in a first tab of the web-based application, the render process 132 may correspond to rendering content in a second tab of the web-based application, and the render process 134 may correspond to rendering content in a third tab of the web-based application. However, in other examples, one or more of the render processes 130, 132, 134 may correspond to different content of a single tab of the web-based application.

In an aspect, the application kernel process 110 may include an enhanced view mode determiner 112 configured to determine whether one or more portions of the digital content is to be displayed in an enhanced view mode. In other words, the enhanced view mode determiner 112 may verify an enhanced view mode is enabled. In an example, the enhanced view mode determiner 112 may verify a setting(s) is selected to determine whether the digital content is to be displayed in the enhanced view mode. The enhanced view mode setting may a setting in the web-based application or an operating system, which indicates the setting to the web-based application. In an example, the enhanced view mode setting may be selected by a user.

In an aspect, the application kernel process 110 may include an interest identifier 114 configured to receive digital content to be displayed by the web-based application, where the digital content is to be displayed according to a first view mode such as identified by the source of the digital content and/or a standard view of web-based application. The interest identifier 114 is also configured to identify user interests within the digital content received or viewed by a web-based application.

In an aspect, the interest identifier 114 may identify areas of interest for the user in response to one or more user actions. In some examples, the interest identifier 114 may receive an input corresponding to a user selected area of interest. The input may include one or more inputs corresponding to gestures from one or more input devices 140 including gestures on a touch screen, from a pen device, captured by a camera or microphone, or by a mouse and/or one or more gestures from a hand or body movement captured via an augmented reality (AR) device (e.g., Hololens) or a movement detection device (e.g., Kinect) identifying an area of interest selected by the user. For example, a user may circle, highlight, or mark an area of interest from the digital content using one or more gestures of the described input devices 140.

In some aspects, the interest identifier 114 may identify areas of interest for the user in response to a prediction of the area of interest. For example, the prediction may be based on a user profile including historical data associated with a user including a demographic profile of the user, past internet or URL searches performed by the user, past regions of a webpage that were enhanced via an enhanced view mode for the user, or fields of interest (e.g., sports, politics) of the user. The interest identifier 114 may include logic/algorithms to determine which portions of the a webpage are closest to the areas of interest associated with the user by measuring similarity of portions of the webpage using word vectors or matching algorithms or using topic modelling to identify topics covered by portions of the webpage and selecting areas of interest based on the areas of interest closest to the areas of interest. In some examples, the interest identifier 114 may match words associated with the areas of interest with words from portions of the webpage. A match may be found based on one or more of an exact word match, a word similarity match, or a confidence level match where similar words having a confidence level score higher than a threshold are considered a match.

In some aspects, the interest identifier 114 may identify areas of interest for the user in response to real-time input from one or more input devices 140. For example, areas of interest may be identified by the interest identifier 114 in response to input from one or more of an EEG kit, a gaze tracking device, or a scroll device or mouse pointer change. In an example, the EEG kit may identify an area of interest based on an EEG attention level of the user increasing above a threshold when looking at a portion of the webpage. In another example, the gaze tracking device may identify an area of interest based on a user staring at a particular portion of the webpage for a threshold amount of time. In another example, the scroll device or mouse pointer may identify an area of interest based on a cursor remaining at a portion of the webpage for a threshold amount of time.

In an aspect, the application kernel process 110 may also include an enhanced view visualizer 116 configured to change a view of portions of the digital content from a standard view to an enhanced view mode. An example of the web-based application changing view modes is shown by FIGS. 2A-2C.

Figure 2A:
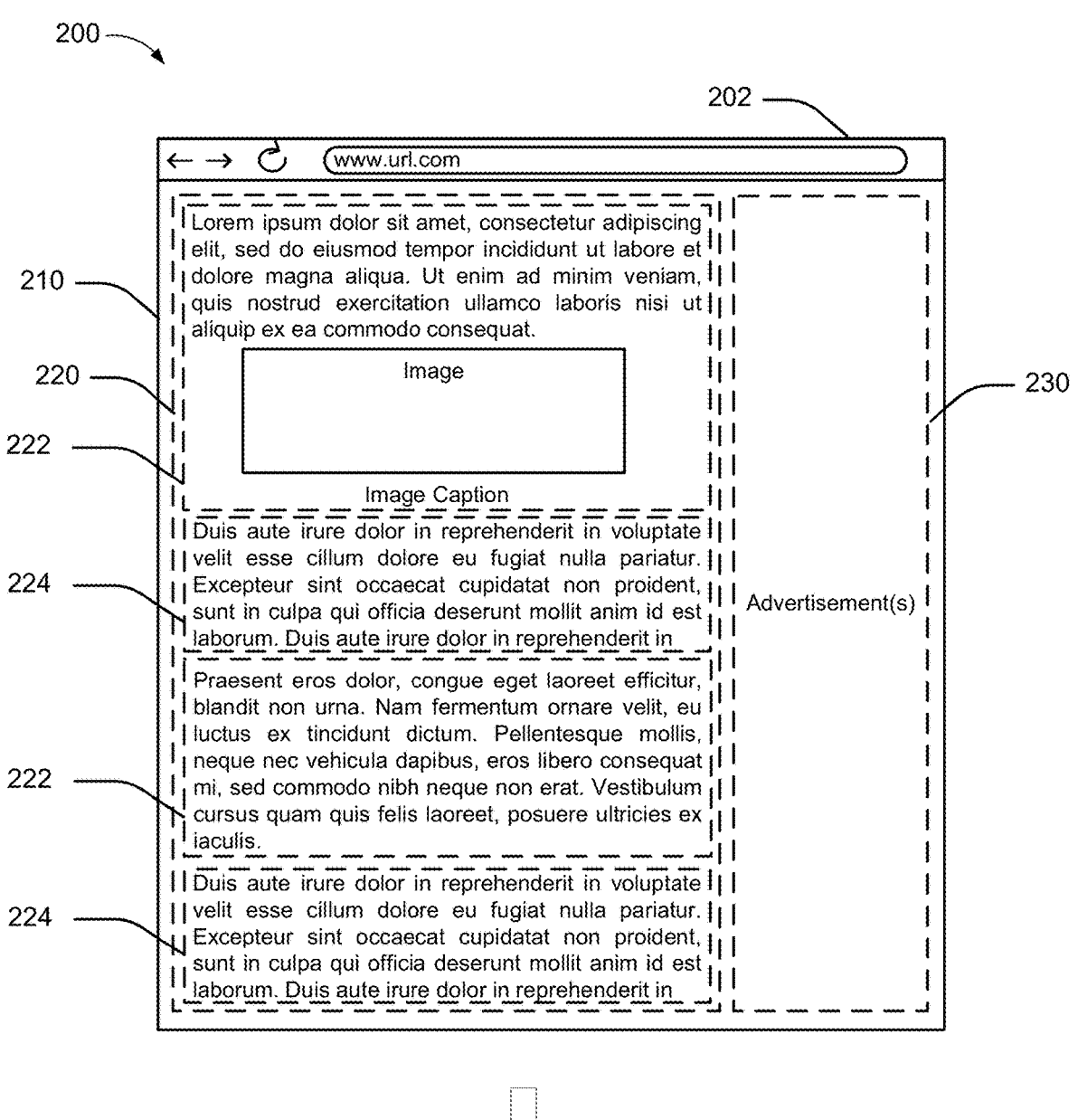
FIGS. 2A-2C are conceptual diagrams of a web-based application transitioning from a standard view mode to an enhanced view mode, according to aspects of the present disclosure.
Figure 2B:
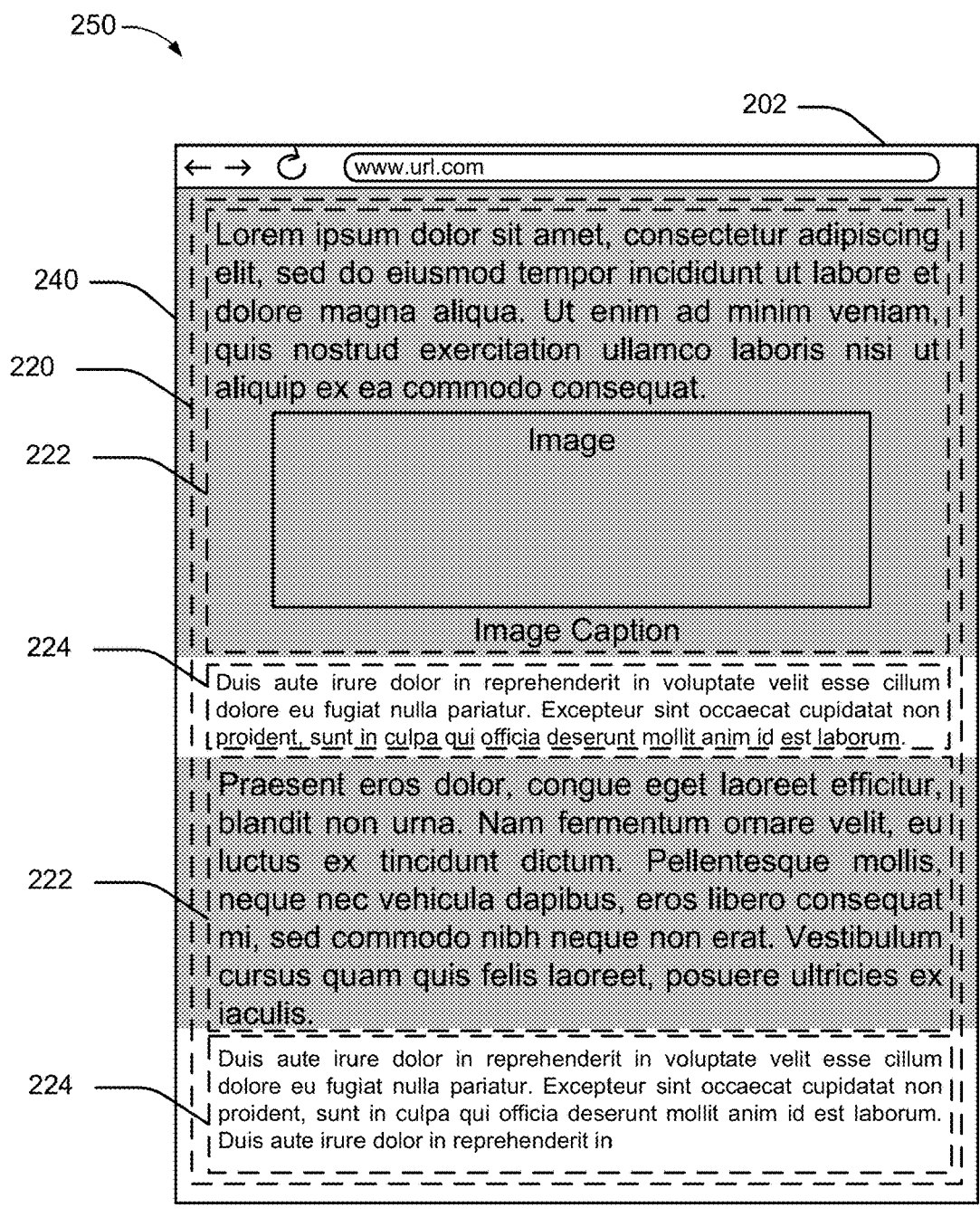
Figure 2C:
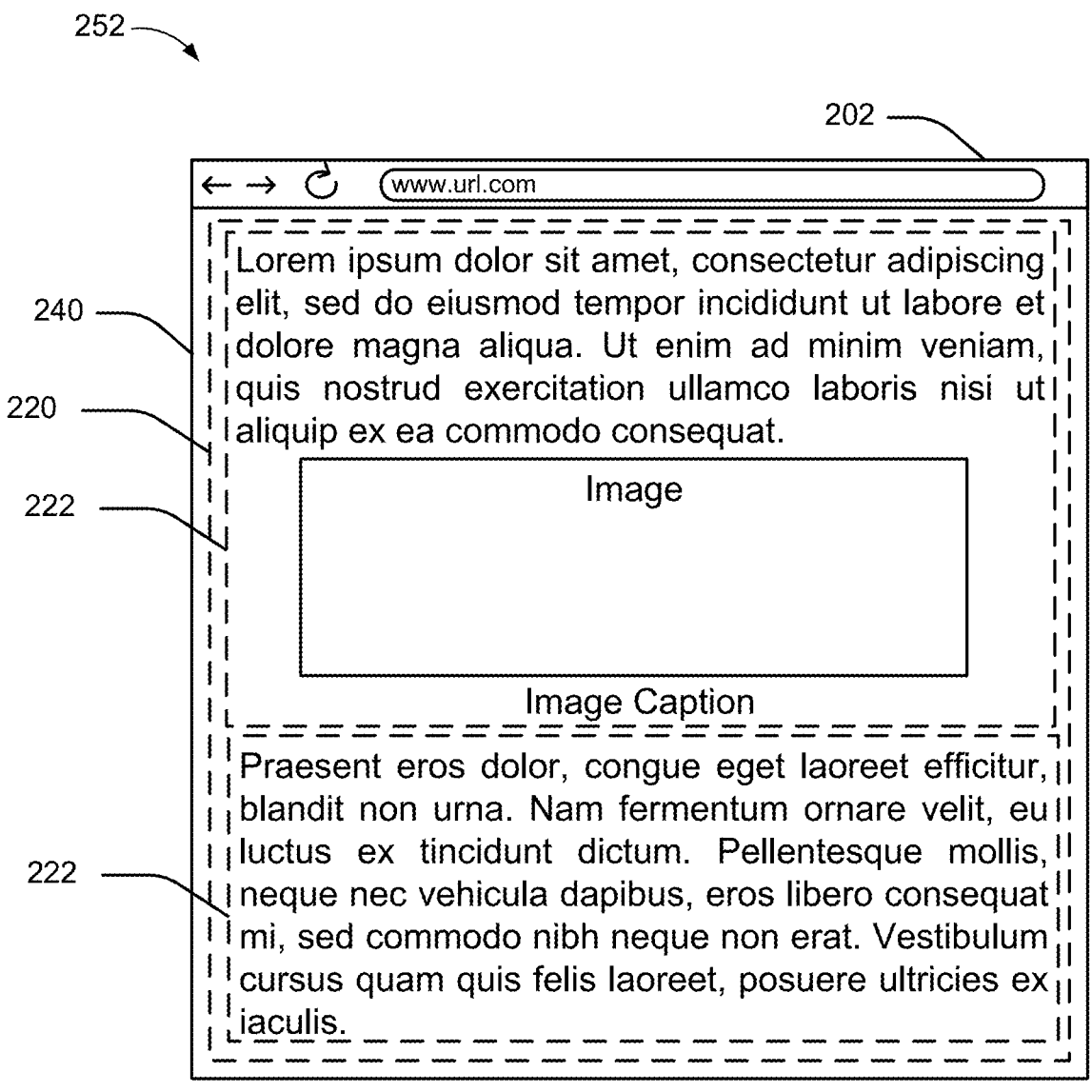

Referring to FIG. 2A, an example 200 of digital content from a web-based application 202 displayed by the display

122 of the computer device 102 transitioning from an standard view mode 210 (e.g., first view mode) to an enhanced view mode 240 is shown. In an example, the web-based application 202 may receive digital content corresponding to a webpage. The digital content may include instructions or code indicating that the digital content is to be displayed according to the standard view mode 210. Further, the web-based application 202 may include settings for displaying the digital content according to the standard view mode 210. In an example of the standard view mode 210, a plurality of portions of the digital content may be displayed including primary content 220 and secondary content 230 for the webpage. Examples of the primary content 220 may include an article(s), an image(s), and/or an image caption(s) corresponding to the digital content. Examples of the secondary content 230 may include an advertisement(s).

When the digital content is received, the enhanced view mode determiner 112 may determine whether an enhanced view mode is enabled, as described herein. If not enabled, an entirety of the digital content may be displayed according to the standard view mode 210.

Otherwise, the interest identifier 114 may identify one or more first portions 222 of the primary content 220 to be displayed according to the enhanced view mode 240 based on user information (e.g., areas of interest corresponding to the user), as described herein.

Referring to FIG. 2B-2C, once the one or more first portions 222 are identified, the enhanced view visualizer 116 may cause the one or more first portions 222 to be enhanced (e.g., text or images enlarged, change of text or background color, highlighting text) according to the enhanced view mode 240, as represented by the larger text and shaded background in example 250 of FIG. 2B or the larger text in example 252 of FIG. 2C, while one or more second portions 224 of the primary content 220 is displayed according to another view mode (e.g., second view mode) such as the view based on the standard view mode 222 (as represented by example 250 of FIG. 2B illustrating smaller text relative to the text of the first portion 222), the removal of the one or more second portions 224 (as represented by example 252 of FIG. 2C illustrating the removal of the one or more second portions 224), or any other view different from the enhanced view mode. Further, in some examples, the enhanced view visualizer 116 may restrict the secondary content 230 from being displayed in the enhanced view mode 240. Accordingly, the web-based application 202 may enhance a user experience through the use of the enhanced view mode 240, which may allow a user to view and read relevant content to the user in an enhanced view while non-relevant content (e.g., one or more second portions 224 and/or secondary content 230) is displayed in a non-enhanced mode or restricted from being displayed.

While FIG. 2A illustrates an example of the digital content being displayed according to the standard view mode 210 and then transitioning to the enhanced view mode 240 in FIG. 2B or FIG. 2C, implementations of the present disclosure are not limited to digital content being displayed first. Instead, the digital content may be received and directly displayed according to the enhanced view mode 240 without having been displayed according to the standard view mode 210 first. Further, while FIG. 2A illustrates an example layout of the web-based application 202 where the digital content is displayed in the standard view mode 210 with the primary content 220 on one side of the web-based application 202 and the secondary content 230 on another side of the web-based application, and the enhanced view mode 240 with the one or more first portions 222 above the one or more second portions 224, aspects of the present disclosure are not limited to these layouts. Instead, the primary content 220 and the secondary content 230, or the one or more first portions 222 and the one or more second portions 224, may be arranged according to any layout.

Figure 3:
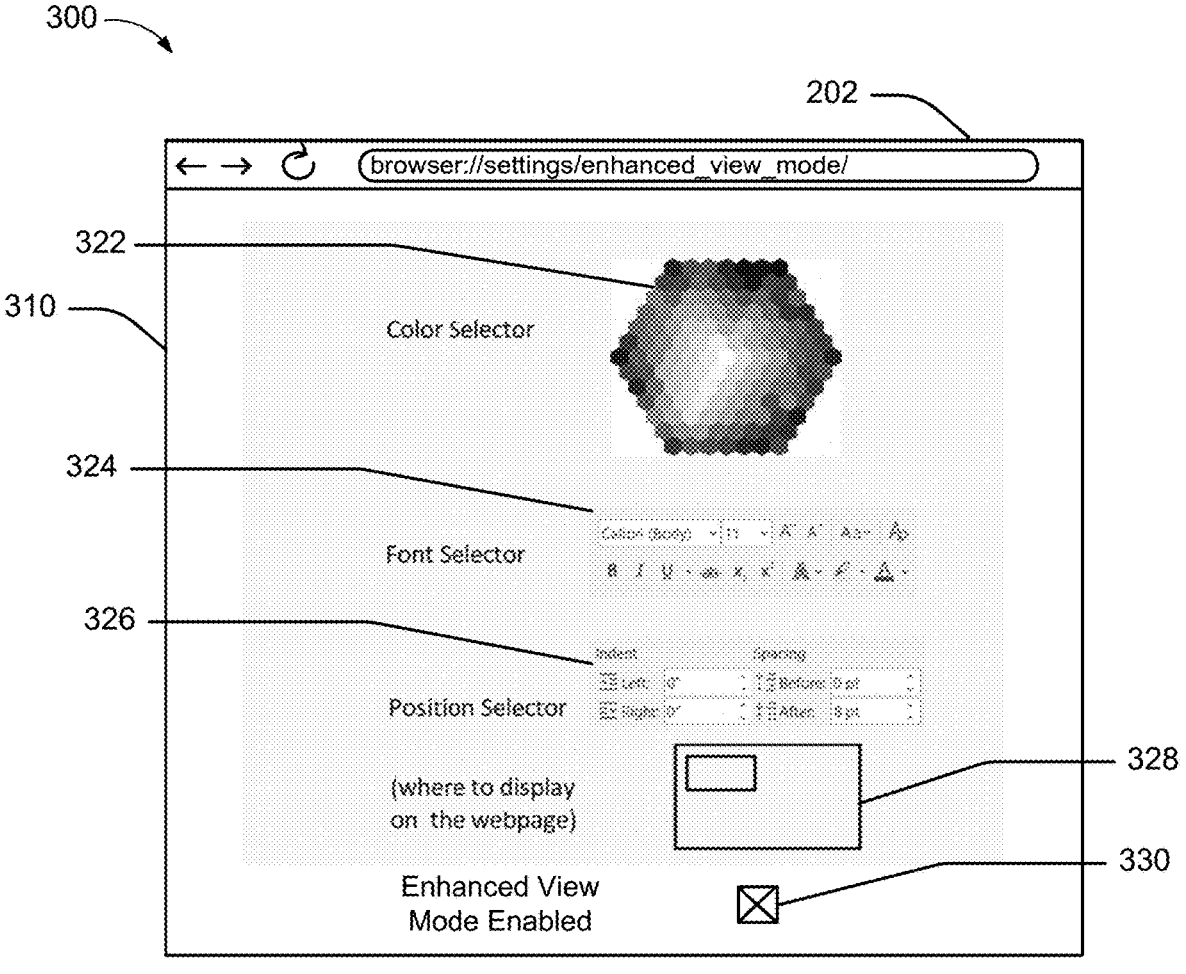
FIG. 3 is conceptual diagram of an example of enhanced view mode settings, according to aspects of the present disclosure.

Referring to FIG. 3, an example of settings that the web-based application 202 may use for the enhanced view mode 240 is described. The web-based application 202 may include a settings page 310 which includes one or more settings a user may select, or which may be set by default, for the enhanced view mode. For example, the enhanced view mode 240 may include a color selector 322 for selecting a background color of the one or more first portions 222, a font selector 324 for selecting one or more options of the font of the one or more first portions 222, a position selector 326 and/or 328 for selecting a position of text or images of the one or more first portions 222, and a enablement selector 330 for selecting to enable/disable enhanced view mode.

Referring to FIG. 4, an example method 400 for selecting relevant content in an enhanced view mode is disclosed. For example, the method 400 may be performed by the computer device 102 of FIG. 1. Examples of some of the operations of the method 400 may be described in relation to FIGS. 1-3 and 5-7.

At 402, the method 400 may include receiving digital content to be displayed by a web-based application according to a first view mode. In an example, the computer device 102 and/or the web-based application 202 receive digital content to be displayed by the web-based application 202 according to a first view mode. For example, the computer device 102 and/or the web-based application 202 may receive the digital content via a communication component and/or communication interface (e.g., communications component 52 of FIG. 7) for exchanging electronic signals, such as for receiving a signal carrying digital content, in response to a URL being entered in an address line of the web-based application 202.

At 404, the method 400 may include determining an enhanced view mode is enabled. For example, the computer device 102, the web-based application 202, and/or the enhanced view mode determiner 112 may determine an enhanced view mode is enabled based on verifying one or more settings of the web-based application 202 such as the enhanced view mode enabled selector 330. For example, enhanced mode determining 112 may verify a value of a setting stored in memory (e.g., memory 50), the computer device 102, or the web-based application 202 to determine an enhanced view mode is enabled. In another example, this setting may be enabled via another application or software such as the operating system settings.

At 406, the method 400 may include identifying one or more first portions of primary content of the digital content to be displayed according to the enhanced view mode based on user information. For example, the computer device 102, the web-based application 202, and/or the interest identifier 114 may identify the first portion 222 of the primary content 220 to be displayed according to the enhanced view mode based on user information. As described herein, the user information may be received based on one or more of user inputs from an input device such as, but not limited to, a stylus, a mouse, a camera, a microphone, an EEG kit, an eye gazing device, or any other input device for identifying user interests. In an example, the user information may include information from an input device predicted user interests, and/or real-time user information, as described by operations 408-410.

At 408, the method 400 may optionally include receiving the user information based on one or more user inputs of an input device. For example, the computer device 102, the web-based application 202, and/or the interest identifier 114 may receive the user information based on one or more user inputs of the input device 140. For example, the user information may be received from the input device 140 via a communications component (e.g., communications component 52 of FIG. 7). In an example, the input may correspond to an indication such as highlighting, circling, marking, or any other gesture made by a user via the input device 140 to indicate user interests of the one or more first portions 222 of the primary content 220.

At 410, the method 400 may optionally include predicting, through machine learning, user interests based on a user profile, and determining the user information based on the predicted user interests. For example, the computer device 102, the web-based application 202, and/or the interest identifier 114 may predict, such as but not limited to, through machine learning or other prediction algorithms, user interests based on a user profile, and determine the user information based on the predicted user interests. In an example, the computer device 102, the web-based application 202, and/or the interest identifier 114 may store a user profile in memory (e.g. memory 50). The user profile may include, for example, historical internet and URL search data associated with the user, a demographic profile of the user, past portions of the primary content 220 that were enhanced via the enhanced view mode for the user, or one or more fields of interest (e.g., sports, politics) of the user. The user profile may rank profile information based on, for example, a number of times the topics of interest are searched for or displayed by the web-based application 202. When digital content is received by the web-based application 202, the computer device 102, the web-based application 202, and/or the interest identifier 114 may compare one or more topics of the digital content with the profile information from the user profile and determine whether there is a match between the a topic and the profile information. In an example, a match may be determined based on a topic modelling technique or a frequency of words appearing. The computer device 102, the web-based application 202, and/or the interest identifier 114 may predict the user information based on matching topics to profile information of the user profile, thereby identifying one or more first portions for display in the enhanced view mode 240.

At 412, the method 400 may optionally include receiving the user information based on one or more monitored user actions. For example, the computer device 102, the web-based application 202, and/or the interest identifier 114 may receive the user information based on one or more monitored user actions corresponding to the input device 140 that is connected to and/or in communication with the computer device 102.

In an example, the input device 140 may be an EEG kit 510 and the one or more user actions may correspond to information from an EEG kit 510, as shown by FIG. 5. A user 502 may wear the EEG kit 510 while viewing content on the web-based application 202 of the display 122. The EEG kit 510 may transmit information (e.g., EEG signal 520) corresponding to electrical brain activity of the user 502 to the computer device 102, the web-based application 202, and/or the interest identifier 114. The information (e.g., EEG signal 520) may indicate an EEG attention level of the user 502 based on viewed content in the web-based application 202. The computer device 102, the web-based application 202, and/or the interest identifier 114 may identify the one or more first portions based on portions of the primary content 220 correlating to higher EEG attention levels. For example, the EEG attention levels of a user may increase when the user views digital content that corresponds to sports. Accordingly, the computer device 102, the web-based application 202, and/or the interest identifier 114 may identify portions of the primary content 220 that correspond to sports based on the real-time viewing of sports related content in the web-based application 202 by the user 502.

In another example, the input device 140 may include a gaze tracking device 610 and the one or more user actions may correspond to information from the gaze tracking device 610, as shown by FIG. 6. One or more eyes of the user 502 may be tracked by the gaze tracking device 610 while the user 502 is viewing content of the web-based application 202 of the display 122. The gaze tracking device 610 may transmit information corresponding to a location of the one or more eyes to the computer device 102, the web-based application 202, and/or the interest identifier 114. The information may indicate topics of interest of the user 602 based on what content on the web-based application 202 that the user 502 is viewing in real-time on the display 122. Accordingly, the computer device 102, the web-based application 202, and/or the interest identifier 114 may identify portions of the primary content 220 that correspond real-time viewing activities of the user 502.

At 414, the method 400 may include displaying the one or more first portions in the web-based application according to the enhanced view mode, and one or more second portions of the primary content according to a second view mode. For example, the computer device 102, the web-based application 202, and/or the enhanced view visualizer 116 may cause the display 122 to display the first portion 222 in the web-based application 202 according to one or more enhanced view mode settings 310 of the enhanced view mode. In an example, the computer device 102, the web-based application 202, and/or the enhanced view visualizer 116 may use one or more of the render processes 130-134 to display the first portion 222. Further, the computer device 102, the web-based application 202, and/or the enhanced view visualizer 116 may cause the display 122 to display the second portion 224 in the web-based application 202 according to a second view mode such as the standard view mode 210 or another view mode.

Figure 7:
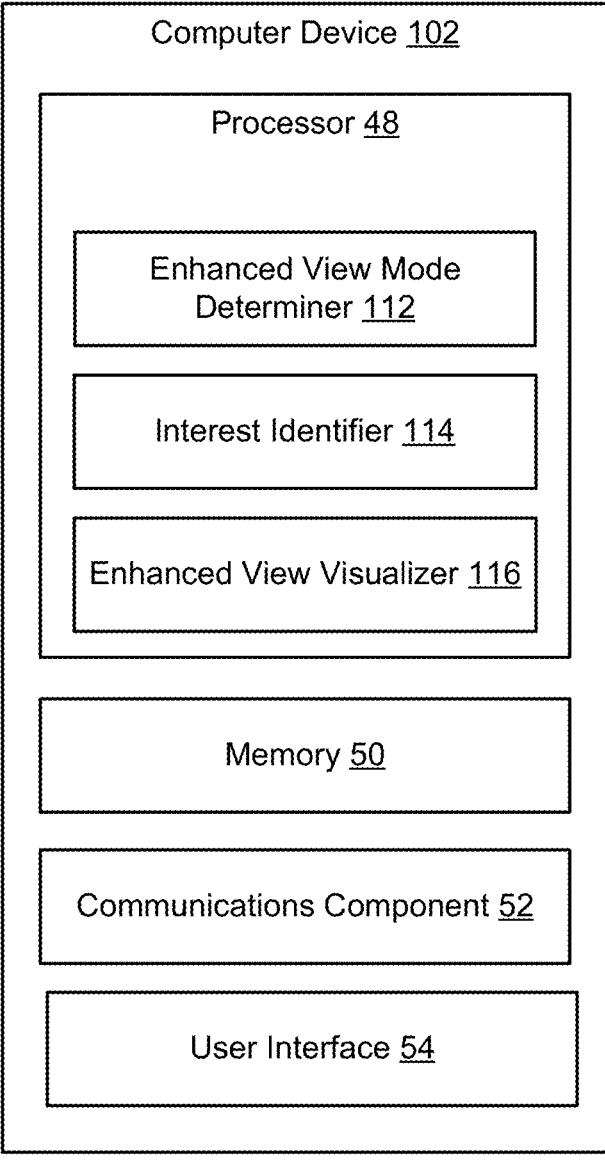
FIG. 7 is a block diagram of additional components of the example computer device of FIG. 1, according to aspects of the present disclosure.

Referring now to FIG. 7, illustrated is an example of other components of the computer device 102 in accordance with an implementation, including additional component details as compared to FIG. 1. In one example, the computer device 102 may include a processor 48 for carrying out processing functions associated with one or more of components and functions described herein. The processor 48 may include a single or multiple set of processors or multi-core processors. Moreover, the processor 48 can be implemented as an integrated processing system and/or a distributed processing system. In an implementation, for example, the processor 48 may include the enhanced view mode determiner 112, the interest identifier 114, and/or the enhanced view visualizer 116.

In an example, the computer device 102 may include memory 50 for storing instructions executable by the processor 48 for carrying out the functions described herein.

Further, the computer device 102 may include a communications component 52 that provides for establishing and maintaining communications with one or more parties utilizing hardware, software, and services as described herein. The communications component 52 may carry communications between components on the computer device 102, as well as between the computer device 102 and external devices, such as the input device 140 and devices located across a communications network and/or devices serially or locally connected to the computer device 102. For example, the communications component 52 may include one or more buses, and may further include transmit chain components and receive chain components associated with a transmitter and receiver, respectively, operable for interfacing with external devices.

Computer device 102 may also include a user interface component 54 operable to receive inputs from a user of the computer device 102 and further operable to generate outputs for presentation to the user. The user interface component 54 may include one or more input devices (e.g., input device 140) including but not limited to a keyboard, a number pad, a camera, a mouse, a touch-sensitive display, a digitizer, a navigation key, a function key, a microphone, a voice recognition component, any other mechanism capable of receiving an input from a user, or any combination thereof. Further, the user interface component 54 may include one or more output devices, including but not limited to a display (e.g., display 122), a speaker, a haptic feedback mechanism, a printer, any other mechanism capable of presenting an output to a user, or any combination thereof.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computing device, comprising:
a memory storing instructions; and
a processor communicatively coupled with the memory and configured to execute the instructions to:
   receive text content of a first webpage to be displayed by a web browser according to a non-enhanced view mode;
   cause display of the text content of the first webpage by the web browser in the non-enhanced view mode;
   detect user inputs, via an input device, with the first webpage indicating portions of the first webpage to be enhanced;
   store, in a user profile, indications of the portions of the of the first webpage to be enhanced;
   receive text content of a second webpage;
   cause display of the text content of the second webpage by the web browser in the non-enhanced view mode;
   detect primary content and secondary content of the second webpage;
   detect, based on the user profile, one or more first text portions of the primary content of the second webpage, wherein detecting the one or more first text portions of the primary content of the second webpage includes:
     comparing one or more topics of the one or more first text portions of the primary content of the second webpage with profile information from the user profile to predict user interests within the text content of the second webpage, wherein the user interests correspond to the one or more topics matching with the profile information based on the indications of the portions of the of the first webpage to be enhanced;
   determine that an enhanced view mode has been enabled, wherein the enhanced view mode is different from the non-enhanced view mode;
   based on the determination that the enhanced view mode has been enabled:
     cause display of the one or more first text portions of the primary content of the second webpage in the web browser according to the enhanced view mode; and
     remove from display one or more second text portions of the primary content of the second webpage in the web browser, the one or more second text portions of the text content of the second webpage being different than the one or more first text portions of the text content of the second webpage; and
     remove from display at least a portion of the secondary content.

2. The computing device of claim 1, wherein the processor is further configured to execute the instructions to:
determine that an enhanced view mode parameter of the web browser has been selected; and
wherein determining that the enhanced view mode is enabled is based on the enhanced view mode parameter having been selected.

3. The computing device of claim 1, wherein the enhanced view mode further includes one or more of an increased font size compared to a font size of the non-enhanced view mode or a new color of a font or a background different from a first color of the font or the background of the non-enhanced view mode.

4. The computing device of claim 1, wherein the secondary content comprises an advertisement.

5. The computing device of claim 1, wherein, in order to predict the user interests within the text content of the webpage, the processor is further configured to execute the instructions to measure a similarity between the profile information and portions of the webpage, using word vectors or matching algorithms or using topic modelling.

6. The computing device of claim 1, wherein the user profile comprises one or more of historical data associated with a user, a demographic profile of the user, past searches performed by the user, past webpage regions that were enhanced via the enhanced view mode for the user, or fields of interest of the user.

7. The computing device of claim 1, wherein the processor is further configured to execute the instructions to:

use a standardized format to save fields of interest of the enhanced view mode; and invoke the enhanced view mode for similar fields of interest on a new webpage at a subsequent time.

8. The computing device of claim 7, wherein, in order to save the fields of interest, the processor is further configured to execute the instructions to save the fields of interest according to a format file, wherein each line in a saved format file includes a field that includes a topic and weight pair, wherein a topic value in the field indicates a name of a topic, wherein a weight in the field indicates a relative importance of the topic.

9. The computing device of claim 1, wherein the processor is further configured to execute the instructions to provide a settings page which includes one or more settings that are selectable for the enhanced view mode.

10. The computing device of claim 9, wherein the settings page includes one or more of a color selector for selecting a background color of the one or more first text portions, a font selector for selecting one or more options of a font of the one or more first text portions, a position selector for selecting a position of the one or more first text portions, or an enablement selector for selecting to enable or disable the enhanced view mode.

11. The computing device of claim 1, wherein the processor is further configured to execute the instructions to use machine learning to predict the user interests within the text content of the second webpage.

12. The computing device of claim 1, wherein the user profile includes past universal resource locator (URL) searches, and predicting the user interests is further based on the past URL searches.

13. The computing device of claim 1, wherein the user profile includes historical data, and predicting the user interests is further based on the historical data.

14. A method, comprising:

receiving, by a web browser, text content of a first webpage to be displayed according to a non-enhanced view mode;

displaying, by the web browser, the text content of the first webpage by web browser in the non-enhanced view mode;

detecting user inputs, via an input device, with the first webpage indicating portions of the first webpage to be enhanced;

storing, in a user profile, indications of the portions of the of the first webpage to be enhanced;

receiving text content of a second webpage;

displaying the text content of the second webpage by the web browser in the non-enhanced view mode;

detecting, by the web browser, primary content and secondary content of the second webpage;

detecting, by the web browser, based on the user profile, one or more first text portions of the primary content of the second webpage, wherein detecting the one or more first text portions of the primary content of the second webpage includes:

predicting user interests within the primary content of the webpage by comparing one or more topics of the one or more first text portions of the primary content of the second webpage with profile information from the user profile, wherein the user interests correspond to the one or more topics matching with the profile information;

determining that an enhanced view mode is enabled, wherein the enhanced view mode is different from the non-enhanced view mode;

based on determining the enhanced view mode is enabled:

displaying the one or more first text portions of the primary content of the second webpage in the web browser according to the enhanced view mode;

removing from display one or more second text portions of the primary content of the second webpage in the web browser, the one or more second text portions of the text content of the second webpage being different than the one or more first text portions of the text content of the second webpage; and removing from display at least a portion of the secondary content.

15. The method of claim 14, wherein determining that the enhanced view mode is enabled comprises:

determining that an enhanced view mode parameter of the web browser has been selected.

16. The method of claim 14, wherein the enhanced view mode further includes one or more of an increased font size compared to a font size of the non-enhanced view mode or a new color of a font or a background different from a first color of the font or the background of the non-enhanced view mode.

17. The method of claim 14, further comprising determining the user interests based on at least one of electroencephalography or gaze tracking.

18. A method for providing enhanced browsing, comprising:

receiving, by a web browser, a webpage including text content;

displaying, by the web browser, the webpage in a non-enhanced view mode;

detecting, by the web browser, primary content and secondary content of the webpage;

detecting, based on a user profile, one or more first text portions of the primary content corresponding to interests of a user, wherein detecting the one or more first text portions includes:

identifying one or more topics of the primary content;

comparing the one or more topics with profile information from the user profile to identify the one or more first portions of the primary content that have a topic matching a topic in the profile information;

receiving a selection of an enhanced view mode user interface element; and based on receiving the selection of the enhanced view mode user interface element, displaying the webpage in an enhanced view mode that is different from the non-enhanced view mode, wherein displaying the webpage in the enhanced view mode comprises:

displaying, by the web browser, the detected one or more first text portions of the primary content of the webpage in the web browser according to first font properties of the enhanced view mode;

displaying second text portions of the primary content according to second font properties of the enhanced view mode, the one or more second text portions being different than the one or more first text portions of the primary content of the webpage and first font properties being different from the second font properties; and removing from display at least a portion of the secondary content.

19. The method of claim 18, wherein the first font properties include a first font size and the second font properties include a second font size, the first font size being larger than the second font size.

20. The method of claim 18, wherein the user profile includes past regions that were enhanced via an enhanced view mode.

* * * * *